Figure 3:
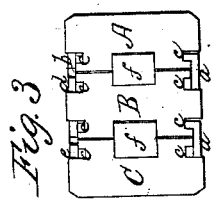

T. Franck,
Extension Table,

Nº 6,302. Patented Apr. 10, 1849.

Witnesses;
W. Serrell
Lemuel W. Serrell

Inventor;
Theodore Franck

UNITED STATES PATENT OFFICE.

THEODORE FRANCK, OF NEW YORK, N. Y.

EXTENSION-TABLE.

Specification of Letters Patent No. 6,302, dated April 10, 1849.

*To all whom it may concern:*

Be it known that I, THEODORE FRANCK, of the city and State of New York, cabinet-maker, have invented and made and applied to use certain new and useful improvements in the construction of slides for extension-tables by so applying metal on the edges of tongued and grooved wooden slides as to form strong and cheap slides, for which improvements I seek Letters Patent of the United States, and that the said improvements are constructively, operatively, fully, and substantially set forth and shown in the following description and in the drawing annexed to and making part of this specification, wherein—

Figure 1:
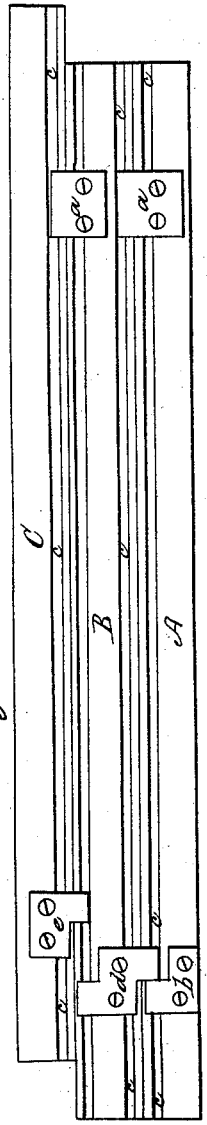
Figure 2:
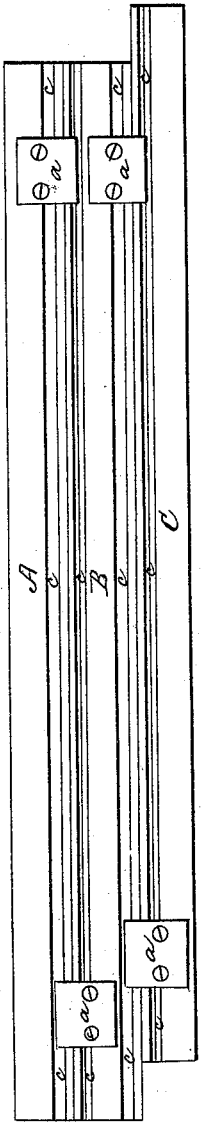

Figure 1, is a plan of the top of three slides; Fig. 2, is the like at the bottom of the same; and Fig. 3, is an end elevation of the three sides; these are shown, as about one third the size for use.

The other figures are separately referred to, and the same letters and numbers, as marks of reference, designate the like parts, in each of the several figures.

In these A, is the first of a set of slides, one end of which is affixed on the bed frames, below the plates of the table bed, in any convenient manner; toward the outer end, this slide is fitted with a single stop and keeper piece of metal $a$, the form of which is shown, of full size for use, in plan and section, in the detached two part Fig. 4. Near the other end, the slide A, is fitted with a single flat stop $b$, of the form shown in Fig. 1, and each inner edge of the slide A, is prepared with a deep narrow groove $c$, with a square rebate on the edge. The second slide B, is fitted with the rebate and groove $c$, on each edge, and the groove in the top, next the slide A, takes the lip on the under side of the stop and keeper piece $a$, see Fig. 4. Toward the other end, a two part stop keeper $d$, shown in full sized plan and section, in the two part Fig. 5, has a lip, that takes the groove in the slide A, and at the other side, a stop part, that overties the opposite groove in the slide B, and toward the other end the slide B, has one of the single stop keepers $a$, see Fig. 4, taking the groove in the third slide C, which is fitted with the rebate and groove $c$, on each inner edge, and has near the other end, a single stop and keeper piece $e$, as shown in Fig. 1, which has a lip, to take the groove in the slide B.

Figure 4:
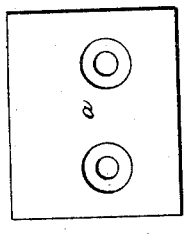
Figure 5:
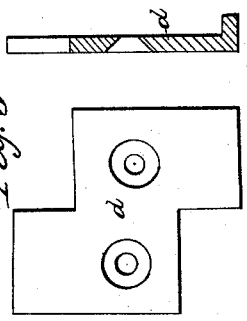
Figure 6:
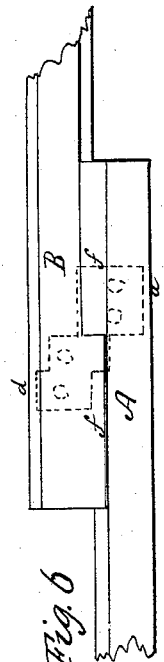

The plan Fig. 2, shows the three slides attached beneath, by two alternate opposite keepers $a$, see Fig. 4, on the middle slide B, one taking the groove in the slide A, toward one end, and the other taking the groove in the slide C, at the opposite side and end; one of each of the same pieces on the slides A, and C, taking the grooves on each side of the slide B, completes the connection of the slides beneath. The rabbets, on the edges of the slides, are made to admit the free sliding, either way, of the bodies of the stop keeper and slide pieces; and the grooves admit the tongues of the metal parts, to travel in them; and the parts, that stop againsta each other on the top, prevent the slides separating longitudinally; the faces of the wood slides are fitted with alternate wide and square grooves, and flat tongues $f$, $f$, to correspond, as shown in Fig. 3, but these tongues and grooves are made, interruptedly alternating in each other, that is, about one sixth of the length, on the face of each slide, is made as a tongue, and the remaining five sixths, as a groove, so that the tongues form stops against each other, in the opposite grooves, as each slide is extended, as shown in sectional plan, in the detached Fig. 6, the inner end, of each interrupted tongue, coming under the inner end of the lip of each metal stop piece, as shown by the dotted lines, in Fig. 6. By these tongues and grooves, the weight of the table bed plates, and of the articles on them are exclusively and strongly supported vertically, and the tongues of the metal pieces, on each side, taking and sliding in the groove $c$, of the next slide, completely prevent the separation of the slides, in a lateral direction, by acting on each edge, for that purpose, without sustaining any part of the weight on the table, or wooden slides, in contradistinction to extension table slides, in which the parts, that keep the slides together, also sustain the weight above them, as is now generally the case. I do not limit myself the number of slides shown in the drawing, as these may be multiplied, in number, and arranged in form, to suit any extent of table, by maintaining the interchanged arrangement of the tongues and grooves, in the faces of the slides, and keeping these together, by keeper and stop pieces, with lips taking grooves and rabbets, on the edges of the slides.

I do not claim to have invented any of the parts used herein, for these purposes, as taken separately, they are well known; but I do claim as new, and of my own invention, and desire to secure by Letters Patent of the United States—

The application to extension tables, of slides, formed with alternate and interrupted tongues and grooves $f, f,$ in the faces, to carry the weight off and on, the table, and kept together by metal stops $b,$ and $e,$ and slide keeper pieces $a,$ and $d,$ having lips, to operate in grooves $c,$ on the edges of the slides, for that purpose, substantially in the manner described and shown.

In witness whereof I have hereunto set my signature this twenty first day of June in the year one thousand eight hundred and forty eight.

THEODORE FRANCK.

Witnesses:
W. SERRELL,
LEMUEL W. SERRELL.